Patented Apr. 5, 1938

2,113,144

UNITED STATES PATENT OFFICE 2,113,144

TARS FOR USE IN ROAD CONSTRUCTION

Alfred Sirot, Bitterfeld, Germany, assignor to I. G. Farbenindustrie Aktiengesellschaft, Frankfort-on-the-Main, Germany No Drawing. Application September 23, 1936, Serial No. 102,248. In Germany December 21, 1935

7 Claims. (Cl. 106—32)

The present invention relates to improvements in tars for use in road construction and particularly their binding properties.

In an application for United States Letters Patent bearing Serial Number 28,874 which was filed by Ernst Bürgin on June 29, 1935 under the title of Binding agents for road construction there is described and claimed a method of improving the binding properties of tars (for instance coal tars) used in the construction of roads, by incorporating with said tars a small proportion of a chlorinated polyvinylchloride, the said latter substance being either dissolved in the tar to be treated in the form of a powder or added thereto in the form of a solution in a suitable solvent which is then mixed with the tar. In this manner the properties of tars on which their utility as binding agents in road construction is dependent, are improved to a high degree. Further, in an application for United States Letters Patent bearing Serial Number 102,247, now Patent No. 2,090,394, which was filed at even date herewith by Alfred Sirot and Georg Wick and entitled improvements in tars for use in road construction, there is described and claimed a process for improving tars for use in road construction and particularly their binding properties which comprises incorporating in the tar a small quantity of an unchlorinated polyvinylchloride. Preferably the unchlorinated polyvinylchloride, in that case, is introduced into the tar dissolved in a suitable solvent, such as anthracene oil, and the tar is heated to a temperature range between about 100 and 150° C. prior to such treatment.

By these additions the binding properties of tars, particularly when used in the construction of roads, are extremely favourably affected and, in particular their stickiness is made to approximate to bitumen in character.

The present invention is based on the observation that a similar favourable effect on the properties of tar is produced also when, instead of the normal polyvinylchloride, certain other vinyl polymerizates or polymerized condensation products of acetylene containing vinyl groups, particularly with pyrrol or a substance containing the pyrrol ring, are incorporated in the tar. The said condensation products may be obtained, for example, by causing acetylene to react in presence of a substance acting as a base on pyrrol or a substance containing the pyrrol ring at a high temperature, and finally polymerizing the condensation product, if desired in presence of an accelerator. In order to be suitable for the purpose of the invention, the aforementioned substances must, however, be either themselves capable of dissolving in the tar or must be such, that they are soluble in a solvent, which is in turn also soluble in the tar without separation of the dissolved substance. While, for example, polyvinyl alcohol would, on this consideration, not appear to be applicable for the purposes of the invention since it is neither itself soluble in tar, nor is there a solvent for this substance known which itself dissolves in tar without separation of the polyvinyl alcohol dissolved therein, there have been found to be especially suitable, for example, polyvinylcarbazole as well as polyvinyl-acrylic acid esters, which are both directly soluble in the usual road tars and, even when incorporated therewith in the proportion of less than 0.5 per cent., produce in the tar a considerable improvement in its binding properties insofar as road construction is concerned. The possibility of obtaining an improvement of properties with other substances, and, indeed, to some extent in a more effective manner than with the normal polyvinylchloride, is of importance, since, with many of these substances, for example the polyvinylcarbazole, decomposition does not occur until a comparatively high temperature is reached so that it is possible to use the tar, treated according to the present invention, even in cases in which the application of the tar is associated with the use of considerably raised temperatures, for example as a binding agent for jointing or as a binding agent for roofing, whereas the tars treated with chlorinated or unchlorinated polyvinylchloride would suffer from a deterioration of their binding properties owing to decomposition of the polyvinylchlorides contained therein.

The additional substances according to the present invention may be advantageously incorporated with the tar either by dissolving a few tenths of one percent. of the weight of the tar to be treated, of the vinyl compound in one of the customary solvents therefor (generally cyclohexanone, or tar oils, such as anthracene oil, heavy oil or middle oil will prove suitable) and thoroughly mixing such solution with the heated (preferably to about 100 and 120° C.) tar, or by stirring the vinyl compound, in the form of a powder, directly with the tar and heating the mixture for a prolonged period, at least for about 1 hour, to a temperature of at least 130° C. at atmospheric pressure, or at a somewhat lower temperature, when a pressure exceeding atmospheric is applied.

The polymerization or condensation of the vinyl compounds may also be produced, if desired, by introducing the parent substances into the tar and effecting condensation thereof in situ.

The following example illustrates the invention:

100 parts by weight of coal tar containing 60 parts of coal tar pitch of softening point 67°, as determined by the Kraemer-Sarnow method, and 40 parts of anthracene oil are heated at about 140° C. To this tar there are added 3 parts of a clear solution of 10 per cent. strength of polyvinylcarbazole in anthracene oil, while intimately stirring. The finished mixture contains 0.3 per cent. of polyvinylcarbazole, and when tested in the ductility meter described by Dow at 3° C. and at an extension of 1 metre, has a thickness of thread of about 4 millimetres, whereas the original tar of the same extension shows a thickness of thread of only about 0.5 millimetres.

In the appended claims the term "vinyl compounds" is intended to include only vinyl polymerizates other than normal and chlorinated polyvinylchlorides, and also polymerized condensation products of acetylene containing vinyl groups.

I claim:

1. A process of improving tars for use in road construction and particularly their binding properties which comprises heating the tar to a temperature between about 100 and about 120° C. and adding to said tar a few tenths of one per cent. of a polymerized vinyl compound of the group consisting of polyvinylcarbazoles and polyvinyl-acrylic acid esters, dissolved in a medium which is also soluble in said tar without precipitation of said vinyl compound.

2. A process of improving tars for use in road construction and particularly their binding properties which comprises heating the tar to a temperature between about 100 and about 120° C. and adding to said tar a few tenths of one per cent. of a polymerized vinyl compound of the group consisting of polyvinylcarbazoles and polyvinyl-acrylic acid esters, dissolved in anthracene oil.

3. A process of improving tars for use in road construction and particularly their binding properties which comprises dissolving in a heated tar a few tenths of one per cent. of a polymerized vinyl compound of the group consisting of polyvinylcarbazoles and polyvinyl-acrylic acid esters in the form of a powder while ensuring its dissolution in the tar by the application of mechanical means, the temperature of the tar corresponding to about 130° C. at atmospheric pressure and varying inversely with the pressure.

4. An improved binding agent particularly for use in road construction comprising a tar and a small quantity of a polymerized vinyl compound of the group consisting of polyvinylcarbazoles and polyvinyl-acrylic acid esters dissolved therein.

5. An improved binding agent particularly for use in road construction comprising a tar and a few tenths of one per cent. of a polymerized vinyl compound of the group consisting of polyvinylcarbazoles and polyvinyl-acrylic acid esters dissolved therein.

6. A process of improving tars for use in road construction and particularly their binding properties which comprises heating the tar to at least 100° C. and adding to said tar a few tenths of one per cent. of a polymerized vinyl compound of the group consisting of polyvinylcarbazoles and polyvinyl-acrylic acid esters, dissolved in a medium which is also soluble in said tar without precipitation of said vinyl compound.

7. A process of improving tars for use in road construction and particularly their binding properties which comprises heating the tar to at least 100° C. and dissolving in said tar a few tenths of one per cent. of a polymerized condensation product of acetylene with a compound of the group consisting of pyrrol and pyrrol derivatives.

ALFRED SIROT.